United States Patent [19]
Alford et al.

[11] Patent Number: 4,817,061
[45] Date of Patent: Mar. 28, 1989

[54] SEISMIC SURVEYING TECHNIQUE FOR THE DETECTION OF AZIMUTHAL VARIATIONS IN THE EARTH'S SUBSURFACE

[75] Inventors: Richard M. Alford, Broken Arrow, Okla.; Heloise B. Lynn, Houston, Tex.; Leon A. Thomsen, Tulsa, Okla.

[73] Assignee: Amoco Corporation, Chicago, Ill.

[21] Appl. No.: 633,163

[22] Filed: Jul. 20, 1984

[51] Int. Cl.$^4$ ............................................. G01V 1/00
[52] U.S. Cl. ....................................... 361/75; 367/36; 367/37
[58] Field of Search ........................ 367/36, 37, 75, 73

[56] References Cited

U.S. PATENT DOCUMENTS

| | | | |
|---|---|---|---|
| 2,880,816 | 4/1959 | Widess et al. | 367/75 X |
| 3,003,577 | 10/1961 | Itria | 367/75 |
| 3,378,096 | 4/1968 | Cherry, Jr. | 367/75 |

OTHER PUBLICATIONS

Crampin, "A Review of the Effects of Anisotropic Layering on the Propagation of Seismic Waves", Geophys. J. R. Astr. Soc., (1977), 54, 9–27.
Crampin et al., "The variation of Delays in Stress-Induced Anisotropic Polarization Anomalies", Geophys. J. R. Astr. Soc., (1981), 64, 115–131.
Keith et al., "Seismic Body Waves in Anisotropic Media: Reflection and Refraction at a Plane Interface", Geophys. J. R. Astr. Soc., (1978), 53, 467–496.
Crampin et al., "Estimating Crack Parameters from Observations of P-Wave Velocity Anisotropy", Geophysics, vol. 45, No. 3, (1980), 345–360.
Crampin, "Seismic Wave Propagation Through a Cracked Solid: Polarization as a Possible Dilatancy Diagnostic", Geophys. J. R. Astr. Soc., (1978), 53, 467–496.

*Primary Examiner*—Thomas H. Tarcza
*Assistant Examiner*—Mark Hellner
*Attorney, Agent, or Firm*—Timothy D. Stanley

[57] ABSTRACT

Polarized shear wave surveys are performed to determine azimuthal variations in the earth's subsurface caused by fracture orientation and density. The surveys may be done by using the same polarization (either horizontal or vertical) shear waves along two different seismic lines of profile, or by using different polarization shear waves along one common line of profile. The survey data are then processed and compared; any differences constitute a measure of fracture orientation and density. Subsurface zones of high fracture density, once identified, have been found to afford a higher likelihood of successful well completion.

50 Claims, 18 Drawing Sheets

FIG.10

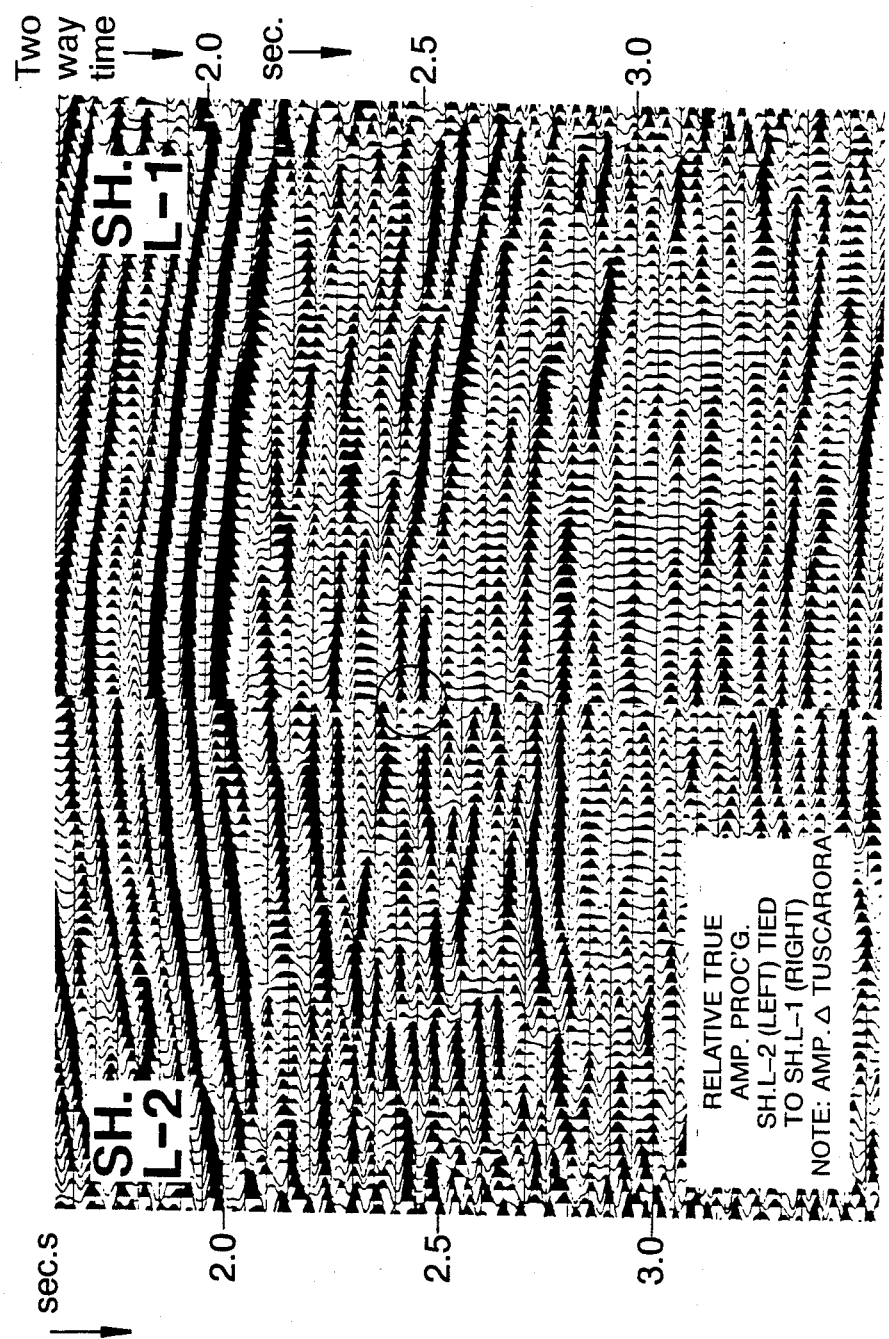

SEISMIC SURVEYING TECHNIQUE FOR THE DETECTION OF AZIMUTHAL VARIATIONS IN THE EARTH'S SUBSURFACE

BACKGROUND OF THE INVENTION

The present invention relates to seismic surveying and specifically to the detection of azimuthal variations in the earth's subsurface formations caused by crack orientation and density.

U.S. Pat. No. 3,302,164 relates to sesimic exploration for detecting fluids in formations by obtaining a ratio of the velocities of shear waves and compressional waves along a seismic line of profile. In order for the ratio to be obtained, however, the frequency spectra of the waves introduced by a seismic source had to be controlled according to the average velocity ratio expected to be encountered. An article, "Combined Use of Reflected P and SH Waves in Geothermal Reservoir Exploration," Transactions of Geothermal Resources Council, Volume 1, May 1977, discussed tests made using both compressional and shear waves in exploring for and evaluating geothermal reservoirs.

U.S. Pat. No. 4,286,332 relates to a technique of propagating seismic shear waves into the earth from compressional wave producing vibrators. U.S. Pat. No. 4,242,742 describes a technique of obtaining shear wave seismic data from surveys where impact devices for waves are used as a seismic energy source.

Recent published studies on the propagation of seismic waves useful in geophysical applications include:

S. Crampin and R. McGonigle, "The Variation of Delays in Stress-Induced Anisotropic Polarization Anomalies," Geophys. J. R. astr. Soc. (1981), v. 64, pp. 115-131.

C. Keith and S. Crampin, "Seismic Body Waves in Anisotropic Media: Reflection and Refraction at a Plane Interface," Geophys. J. R. astr. Soc. (1977), v. 49, pp. 181-208.

C. Keith and S. Crampin, "Seismic Body Waves in Anisotropic Media: Synthetic Seismograms," Geophys. J. R. astr. Soc. (1977), v. 49, pp. 225-243.

D. Booth and S. Crampin, "The Anisotropic Reflectivity Technique: Anomalous Reflected Arrivals from an Anisotropic Upper Mantle," Geophys. J. R. astr. Soc. (1983), v. 72, pp. 767-782.

D. Booth and S. Crampin, "The Anisotropic Reflectivity Technique: Theory," Geophys. J. R. astr. Soc. (1983), v. 72, pp. 755-766.

S. Crampin, "Seismic Anisotropy—a Summary," J. Geophy., v. 43 (1977), pp. 499-501.

S. Crampin, R. McGonigle and D. Bamford, "Estimating Crack Parameters from Observations of P-wave Velocity Anisotropy," Geophysics, v. 45, no. 3 (1980), pp. 345-360.

S. Crampin, "Seismic Wave Propagation Through a Cracked Solid: Polarization as a Possible Dilatency Diagnostic," Geophysics J., v. 53, no. 3 (1978), pp. 467-496.

S. Crampin, "A Review of the Effects of Anisotropic Layering on the Propagation of Seismic Waves," Geophysics J., v. 54 (1977), p. 475.

All of the above have focused on theoretical or observational investigations regarding the propagation of seismic waves in mathematical models or laboratory media having an anisotropic character with applications to the deep interior of the earth.

SUMMARY OF THE INVENTION

According to the present invention, a seismic surveying method has been developed to detect the orientation and density of preferentially oriented fractures in the earth's subsurface. These fractures cause azimuthal variations in the velocity and reflection amplitude of seismic shear waves imparted into the earth's subsurface. Hence, azimuthal dependence of shear wave event times and reflection amplitudes can be a positive indicator of fracture density in tectonically fractured areas. Zones of high fracture density, once identified, are indicative of areas where production from drilled wells is more likely to be successful.

Shear wave seismic energy polarized in a first direction is imparted into the earth along a first seismic line of profile and the reflected shear wave seismic energy is recorded with a first geophone having a matched polarization. Shear wave seismic energy polarized in a second direction is imparted into the earth along a second seismic line of profile and the reflected shear wave seismic energy is recorded with a second geophone having a matched polarization. The first and second records are processed to produce a first and second shear wave section such that the first and second polarized shear wave sections can be compared to determine azimuthal variations in the earth's subsurface formation.

It is preferred to have the first and second seismic shear waves polarized orthogonally to each other, one of which is orthogonal to the principal orientation of fractures within the earth's subsurface formations. Differential shear wave velocities, and reflection anomalies thus produced are a result of the anisotropy of oriented fractures in the earth's subsurface formations.

In a first embodiment of the invention, two crossing seismic lines of profile are utilized to investigate fractures and their orientation and density in subsurface formations. Shear wave seismic energy polarized in a first direction is imparted to the earth at selected points along a first seismic line of profile and the response of the earth formations to the shear wave seismic energy is recorded with a geophone having a matched polarization. Shear wave seismic energy polarized in a second direction is imparted into the earth along a second seismic line of profile and the response of the earth formations to the shear wave seismic energy is recorded with a geophone having a matched polarization. The recorded responses of the first and second seismic shear waves along both the first and second seismic lines of profile are processed to form shear wave seismic sections for both the first and second seismic lines of profile to determine the presence of fractures and their orientation and density at and near the intersection of the seismic lines of profile.

In the first embodiment, it is preferred that the seismic lines of profile intersect substantially orthogonally and that one of the two seismic lines of profile is substantially parallel to the surface of the fractures in the earth's subsurface formations, while the second of the seismic lines of profile is substantially perpendicular to the surface of the fractures in the earth's subsurface formations.

In a second embodiment of the invention, a single seismic line of profile is utilized to investigate for fractures and their orientation and density in the subsurface formations. Shear wave seismic energy polarized in a first direction is imparted into the earth at selected points along the seismic line of profile, and the response of the earth's formation to the shear wave seismic energy is recorded with a geophone having a matched polarization. Shear wave seismic energy polarized in a second direction is imparted into the earth at selected points along the seismic line of profile and the response of the earth's formation to the shear wave seismic energy is recorded with a geophone having a matched polarization. The recorded responses are processed to produce two shear wave seismic sections along the seismic line of profile to determine the presence of anomalies in arrival time and reflection amplitude, and hence of fractures and their orientation and density in the formation.

In both embodiments, seismic compressional energy can also be imparted into the earth's subsurface formations and recorded along the seismic lines of profile. The recorded compressional energy provides additional information to compare with the seismic shear wave energy to supplement the shear wave data.

BRIEF DESCRIPTION OF THE DRAWINGS

FIG. 10 is a vertical cross-sectional view of three subsurface earth formations; and FIGS. 11, 12, 13, 14, 15, 16, 17, and 18 are test data obtained in seismic surveys conducted at the shot point locations of FIG. 9.

DETAILED DESCRIPTION

I. Introduction

Figure 1:
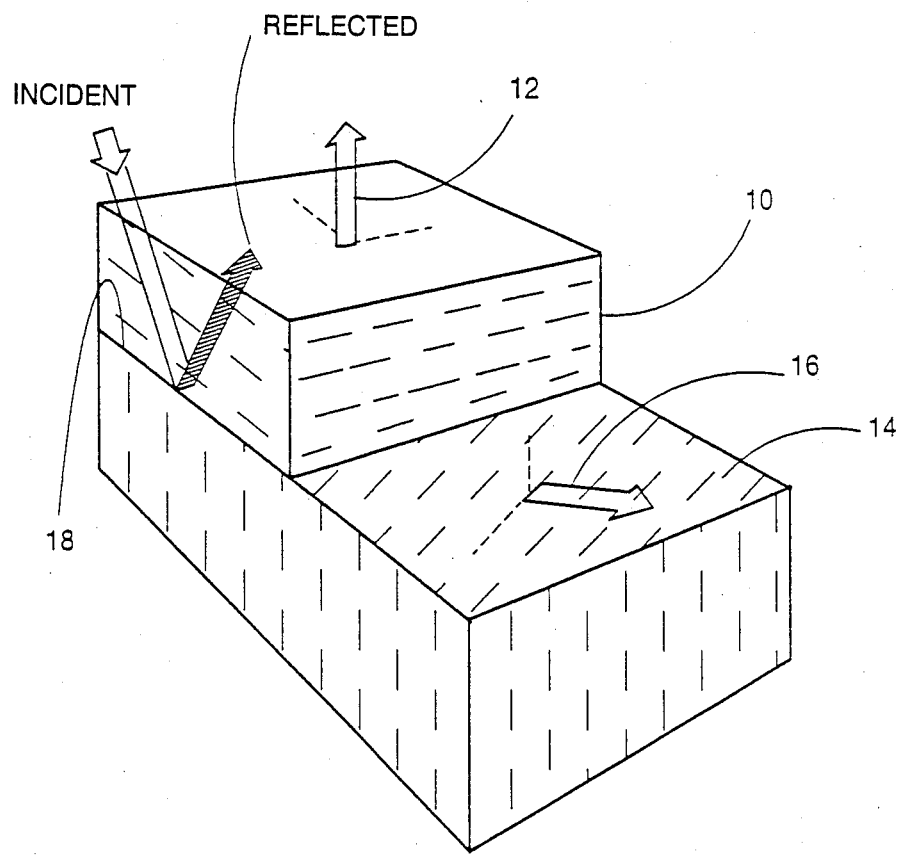
FIGS. 1, 2, and 3 are simplified diagrams of fractured subsurface earth formations.

At the outlet, brief introductory remarks by way of summarization are submitted as an overview to assist in understanding the subject matter of the present invention. When rock is fractured or cracked at depth, fractures are usually oriented vertically, because the minimum principal stress is usually not vertical. Therefore, oriented fractures usually make the rock anisotropic. If there is a regional tectonic tensional stress (or paleostress), the fractures will be oriented nearly parallel, with their surfaces substantially perpendicular to the horizontal diection of minimum stress.

In the present invention, oriented fractures have been found to exhibit a pronounced effect on shear wave velocity with a polarization perpendicular to the surfaces of the fractures. Fractures have also been found to exert a much lesser effect on shear wave velocity with a polarization parallel to the surface of the fractures and on compressional waves. When the fractures are substantially vertical and with a preferred orientation, such polarization dependence manifests itself as azimuthal dependence of shear wave veloicty with respect to the azimuth of the survey line. We have found that any dependence of vertical incidence traveltime or reflection amplitude of the shear wave polarization on azimuth of the survey line can be a positive indicator of fracture density in tectonically fractured areas.

As a specific example, vertical parallel fractures cause reflection anomalies between two orthogonally intersecting shear wave survey lines in which the shear waves are similarly polarized with respect to the seismic lines of profile. However, the direction of polarization of each shear wave is different with respect to the parallel fractures. A bed containing fractures has a different effective shear velocity and impedence on the shear waves imparted along the survey line parallel to the surfaces of the fractures than it does on the shear waves imparted along the survey line perpendicular to the surfaces of the fractures. Thus, we have found that there will be, depending on the impedance of an overlying bed, a different reflectivity on the shear waves of the two lines at the intersection point. Similar differences have been found to occur between orthogonally polarized sets of shear waves along a single line of profile; here the comparison is valid along the entire line.

The strength of the effect has been found to depend approximately on the fracture density e:

$$e = \frac{3}{4\pi} \frac{\eta}{\alpha} \quad (1)$$

where $\eta$ is the fracture porosity (volume fraction occupied by fractures).

The aspect ratio $\alpha$ is a small number which indicates the shape of the fracture ($\alpha$=thickness/length). Since $\alpha$ is small, e may be substantial (indicating substantial anisotropic effects), even though $\eta$ may be small. It is clearly seen in Equation No. 1 that e, "fracture density," can be verbalized as a "fracture porosity distribution" term, since $\eta$ (fracture porosity) is modified by (divided by) $\alpha$ (a distribution term). The reflection anomalies obtained with the present invention offer a positive diagnostic for the presence of open fractures and provide information about their contents. By contrast, if the fractures are mineralized, clay-filled, or otherwise closed, the anisotropy depends only upon the fracture porosity, $\eta$, which is much smaller than e. The anisotropic effects discussed herein are expected to be small.

It is understood by those skilled in the art that a shear (transverse) wave having SH polarization is one in which the shear waves are polarized horizontally. Similarly, a shear wave having SV polarization is one in which the shear waves are polarized in a vertical plane parallel to the seismic line of profile.

Only transversely isotropic media are analyzed explicitly here, although more generally anisotropic media will show similar effects. Transversely, isotropic media have one unique axis and two equivalent axes (at right angles to the unique axis) such as in each layer of FIG. 1. It is common in geophysics that a layer 10 has its unique axis 12 vertical, because the direction of gravity is the ultimate cause of the anisotropy. The anisotropy is most commonly due to:

(1) homogeneous but anisotropic beds (typically shales) which have a preferred orientation of mineral grains, due to settling under gravity;

(2) isotropic beds, thinly layered, so that a sound wave with wavelength much longer than the layer thicknesses averages over many layers, and propagates as if in a homogeneous, anisotropic medium;

(3) vertical fractures, whose planar sides are oriented randomly in all horizontal directions, due perhaps to diagenesis.

These effects may be present in any combination.

However, in the case where transverse isotropy occurs in regions having some tectonic tensile stress, a preferred horizontal direction is imparted to the fractures. In such a setting, tensile fractures may open, with their planar surfaces perpendicular to the direction of least compressive stress. If the rock mass is otherwise isotropic, such fractures create a transversely isotropic medium 14 whose unique axis 16 is horizontal. Anisotropic wave propagation effects can be used according to the present invention to provide diagnostic evidence for the presence of such fractures. Such effects are more prominent in shear (S)-wave than in compressional (P)-wave propagation, and may be missed altogether by a field program and interpretation based upon the premise of isotropy. Since such fractures may be essential to the productivity of a reservoir, through both their porosity and their permeability, their detection is of great economic importance.

II. Effects on Velocities

It is well known that, whenever a seismic survey is conducted over a formation which is intrinsically anisotropic, the moveout velocity obtained by standard methods is not equal to the vertical velocity of the medium. This is true even in the absence of layering and dip of the reflector. The apparent velocity differs from the vertical velocity simply because of the angular dependence of the wave-velocity.

The true vertical velocity can be used along with the vertical travel time to determine the depth to, or the thickness of, a given bed; i.e., to convert a time section to a depth section. Hence, if the apparent velocity is naively taken to be equal to the vertical velocity, a misestimation of depth and/or thickness may result. Such errors may commonly be as large as ±10%.

The discussion below pertains to this true vertical velocity, not the apparent or moveout velocity.

A. "Horizontally" Oriented Anisotropic Media: Survey Line Perpendicular to Unique Axis The geometry for this case is given in FIGS. 1 and 2. The presence of the fractures slows down the SH wave, i.e., the shear wave having a direction of polarization perpendicular to the line of survey, where the seismic survey line is parallel to the surface of the fractures. These results may be best understood with the help of FIG. 2 and an analogy. Imagine that the anisotropic medium may be represented by a thick deck of business cards, standing on their edges. The empty planes between the cards represent the fractures; the deck is oriented so that the edges of the cards show on two ends and the top of the deck. Pressing one's hand down on the top of the deck represents a vertically incident P-wavefront. As the hand oscillates up and down, simulating longitudinal particle displacement, the deck deforms only with difficulty. The fractures have not weakened the deck; to deform the deck requires that the cards themselves, analogous to the uncracked rock itself, be deformed. The high resistance to longitudinal deformation implies a large longitudinal elastic modulus, and hence a large longitudinal velocity.

This analogy is accurate if the fractures are filled with a liquid. However, if they are filled with a highly compressible gas, this may be accommodated in the analogy by separating each of the cards slightly, so that they can bend sideways (closing the fractures) with the application of vertical stress. In this case, the presence of the vertical fractures does slow down the P-wave slightly; the effect remains much smaller, however, than for shear waves. It may become pronounced for oblique incidence.

Figure 2:
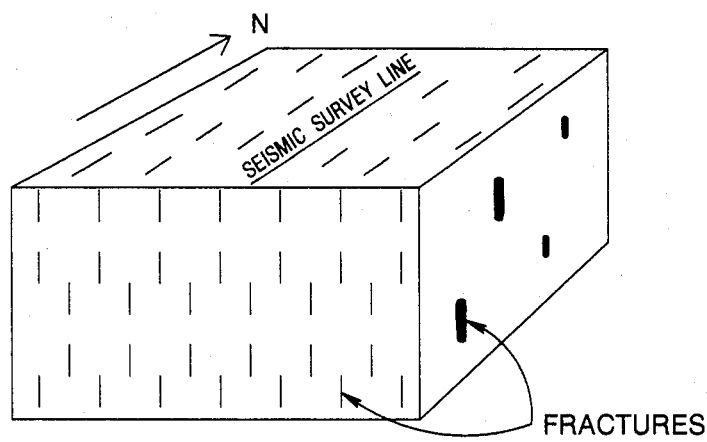

Now, an SH wave, generated along the survey line shown in FIG. 2, will have an E-W displacement. The hand in the analogy now represents a vertically incident SH wavefront. As the hand rocks E-W across the top of deck simulating SH displacement, the deck deforms easily in shear. The zones of weakness from spaces between cards (by analogy, the fractures) allow the zones of strength of the cards (the rock) to slide past one another, so that the strain occurs in the weak fractures rather than the strong rock. The low resistance to shear implies a low shear modulus $\mu_0$ and hence a low shear velocity, $\beta_0$.

By contrast, if the hand were rocked N-S along the top of the deck simulating SV-wave displacement, i.e., a shear wave having a direction of polarization lying in a vertical plane parallel to the survey line, the fractures could not accommodate the strain, and to deform the deck by hand one must actually deform the cards themselves (by analogy the rock matrix itself). This is clearly harder to do; the hand is straining against the modulus $\mu$ of the uncracked medium and $\mu > \mu_0$. Hence the shear velocity $\beta > \beta_0$. It is clear that the velocity $\beta$ is the shear vertical velocity of an SV wave along this same survey line. As for the other waves in this polarization, the apparent SV velocity is equal to the vertical SV velocity.

The contrast between $\beta$ and $\beta_0$ in the card-analogy is greater than the contrast found for fractured rock because, in the rock, the fractures are not continuous throughout the region, as in the card deck. However, the principle is the same. Although this discussion pertains to vertical incidence, the phenomenon can be extended to any angle of incidence.

B. "Horizontally" Oriented Anisotropic Medium: Survey Line Parallel to Unique Axis The geometry for this case is shown in FIGS. 1 and 3.

Referring to FIG. 3 and again to the analogy, the hand, representing a vertically incident P-wavefront as before, must deform the cards themselves (the rock itself) in order to deform the deck. The fractures do not weaken the deck, regardless of their azimuthal orientation.

Figure 3:
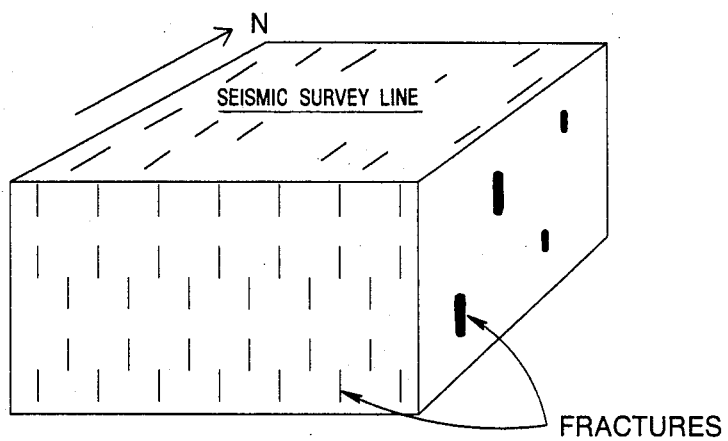

Now, with the hand representing a vertically incident SH-wavefront on the seismic survey line of FIG. 3, a N-S rocking motion represents the SH displacement. As discussed before, for such a shear, the fractures do not weaken the rock. Hence, the effective shear modulus and the SH velocity are high.

In light of the above analysis, the following generalization can now be made about the vertical velocities obtained on two seismic survey lines crossing at right angles, over a region containing vertical fractures having surfaces which are substantially parallel to one of the two seismic survey lines. These comments do not apply to the relative apparent or moveout velocities obtained by comparing moveouts along a reflection hyperbola on the two stacked sections.

1. If the fractures are liquid-filled, the P-velocity will be nearly the same on both lines, especially for near offsets. That is, the P-lines should tie together well, and there will be little indication of the presence of the fractures.

2. If the fractures are gas-filled, the P-velocity will be somewhat greater on the survey line parallel to the fractures. For such gas-filled fractures, the fractures may also be apparent in P, even for near-vertical incidence. However, the fractures are evident in shear whether they are filled with liquid or with gas.

3. The "SH" velocity will be less on the survey line parallel to the surface of the fractures.

4. The "SV" velocity will be less on the survey line perpendicular to the surface of the fractures.

In a case where both SH and SV are measured on a single survey line, the rules above are not applicable; however, the same principles yield the following generalization.

5. If the survey line is roughly parallel to the surface of the fractures, the "SH" velocity will be less than the "SV" velocity. If the line is roughly perpendicular to the surface of the fractures, the "SH" velocity will be greater than the "SV" velocity.

These comments should serve as an aid to those skilled in the art, based on this Section II, to identify the presence, orientation, and contents of the fractures, in terms of vertical velocities. There will be, in addition, reflection anomalies (reflections dependent on azimuth) due to the fractures. These are discussed below in Section III.

III. Effect on Reflection

Considering again FIG. 1, two seismic layers are shown schematically. An upper layer 10 is transversely isotropic with its unique axis 12 pointed vertically. This is the orientation most commonly considered as an anisotropic medium in geophysics. By contrast, a lower layer 14 is specified to be a transversely isotropic medium with a unique axis 16 which is horizontal, parallel to the interface 18 between layers 10 and 14. If the interface 18 separating the layers 10 and 14 is sharp (compared to a wave length), seismic waves will reflect off it, causing reflection arrivals which are azimuthally dependent. Furthermore, Applicants and others have found that this azimuthal dependence is markedly different for shear waves than for compressional waves.

The anisotropic reflection anomalies are a key diagnostic of the presence of fractures, in many cases. Further, the fractures themselves can provide an indicator to the economics of a given reservoir, through the porosity, as well as the permeability associated with such fractures. An example of such an anisotropic reflection anomaly would be a strong reflection in one polarization of shear, at a certain arrival time, and a much weaker reflection at the corresponding time for another polarization of shear. The two polarizations of shear could come from two shear surveys at right angles to each other, or from a shear survey utilizing both horizontally polarized shear waves, SH, and vertically polarized shear waves, SV, along a single survey line.

A reflection anomaly constitutes either a "bright spot" or a "dim spot" (depending on the elastic impedance of the overlying layer 10). In conventional analysis of such bright or dim spots, it has been found important to compare compressional wave reflections with shear wave reflections, in order to distinguish a Hydrocarbon Indicator (HCI) from a Lithologic Change Indicator (LCI).

In the present invention, the anisotropic reflection anomalies depend on the fact that the shear modulus of the fluid in the fractures is zero. Thus, the shear modulus indicates the presence of a fluid, be it oil, gas, or water. The indication requires comparison of shear wave reflections with two different shear polarizations, rather than between compressional (P) and shear waves (S) reflections, as in the isotropic case. The presence of a bright reflection in one S-polarization, and a much weaker one in the other S-polarization is thus a positive indicator of the presence of fluids (liquid or gas). Since it is bright in only one direction, it might be termed a "one way bright spot" or an Anisotropic Fluid Indicator (AFI).

Figure 4:
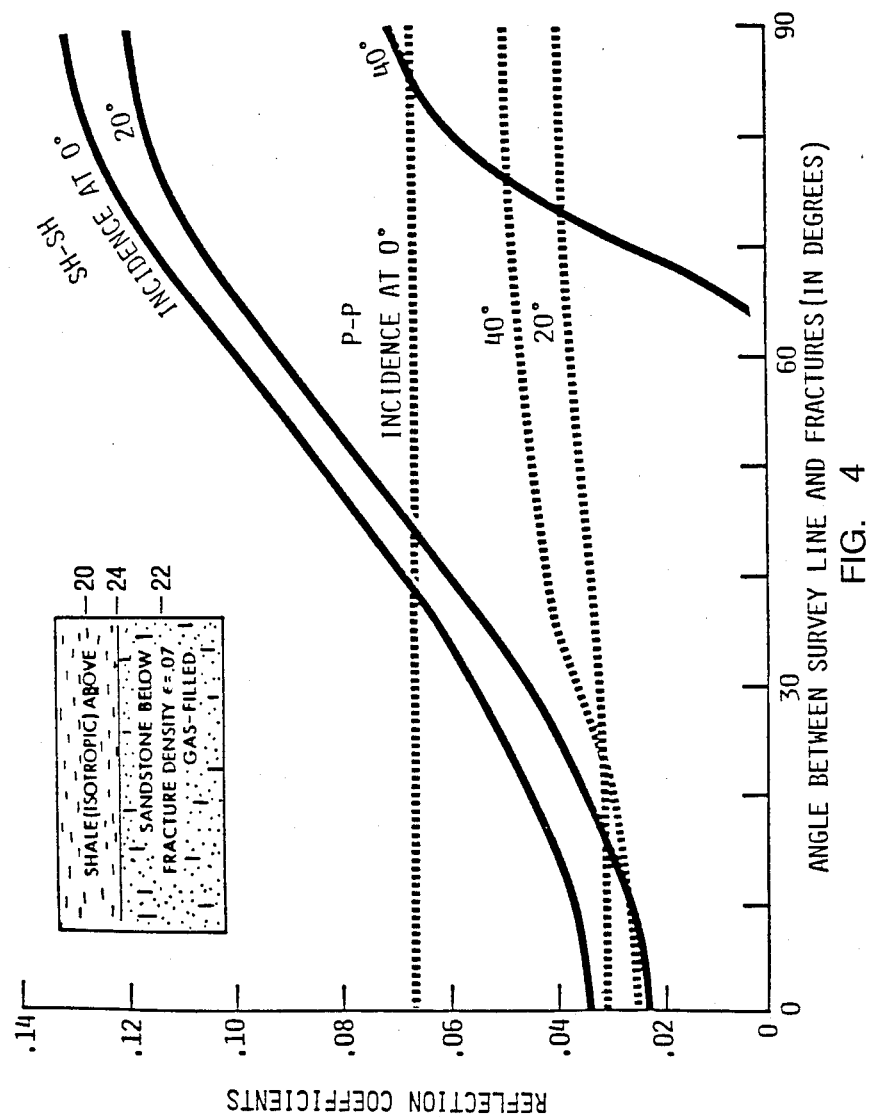
FIGS. 4, 5, 6, and 7 are diagrams of reflection coefficients as a function of the angle of intersection between survey lines of profile for compressional, horizontal shear and vertical shear seismic surveys.

As a first example, FIG. 4 shows a lithologic change at a boundary between a medium 20, taken to be an isotropic shale (slow in P and S), capping a sandstone (intrinsically faster in P and S) lower medium 22, which is permeated by parallel vertical fractures containing gas. The interface 24 is assumed to be horizontal. FIG. 4 shows two sets of curves of theoretical reflection coefficient as a function of angle of azimuth. The first set (dashed) is for incident P-reflected P and shows modest azimuthal dependence. That is, the P-waves do not detect the presence of these vertical fractures very well, unless large angles of incidence are used. Since the P-waves behave largely as though the lower medium 22 were also isotropic, and since normally only P-waves are considered in exploration, it is not unreasonable that the presence of such fractures has largely gone undetected by conventional seismic exploration methods, even though they may be quite common, especially in areas of tectonic deformation.

By contrast, the second set of curves (solid) in FIG. 4, showing the reflection coefficient for incident SH-reflected SH, shows a strong azimuthal dependence, for all angles of incidence. A Common Depth Point (CDP) stack for angles-of-incidence up to 45° would clearly show a bright reflection off this interface 24 at an azimuth of 90°, and a much smaller one at an azimuth of 0°. It is this major difference in reflection coefficients, which according to the present invention constitutes an Anisotropic Fluid Indicator (AFI).

The azimuthal orientations discussed above refer to the angle between an SH survey line and the strike of the fractures. An equivalent way of looking at these results is available at normal incidence (incidence at 0°): an SH reflection at a given azimuth is identical to an SV reflection at the co-azimuth (coazimuth=90°−azimuth). Hence, the anisotropy (and hence the presence of the fractures) may be detected by comparison of SV and SH reflections along a single line.

Figure 5:
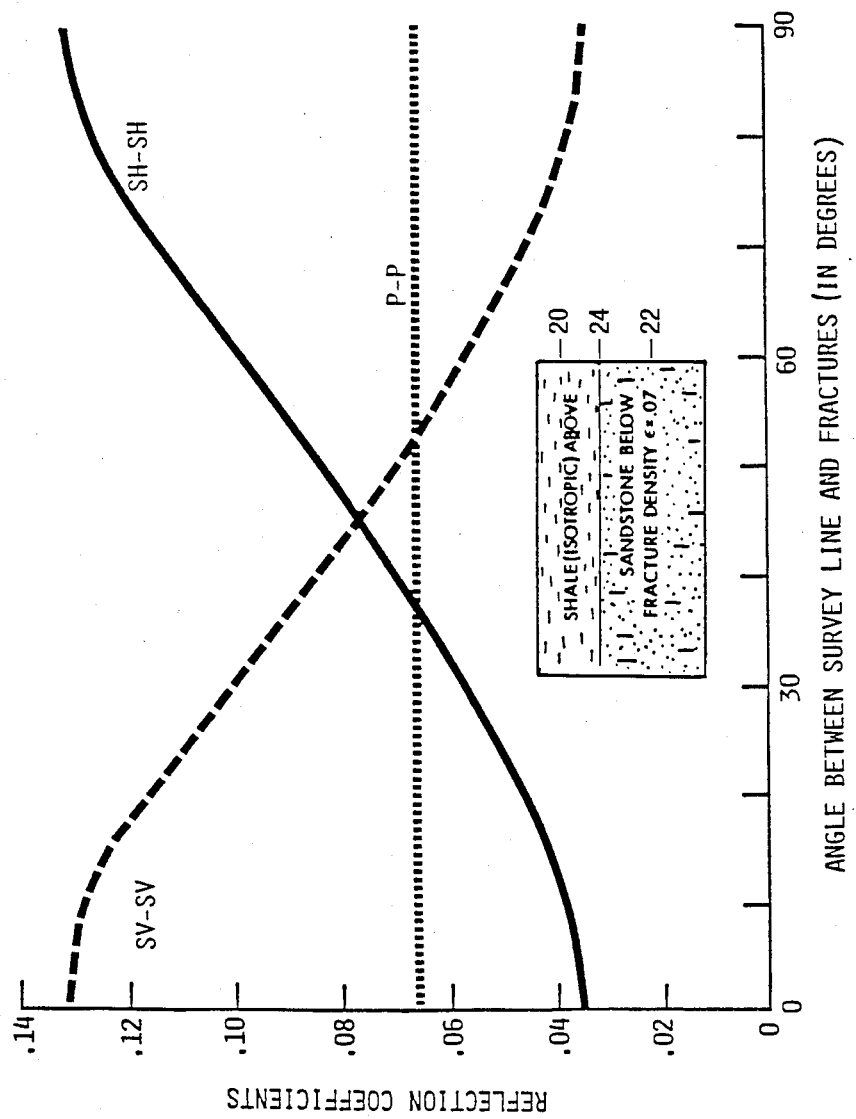

FIG. 5 shows all three reflection types, as a function of azimuth, for the example of FIG. 4, at normal incidence only. The difference beween SV reflections and SH reflections can be seen to be striking at most azimuths.

As such, one can detect the presence of the fractures by comparing reflections from orthogonally crossing SV or SH lines.

Figure 6:
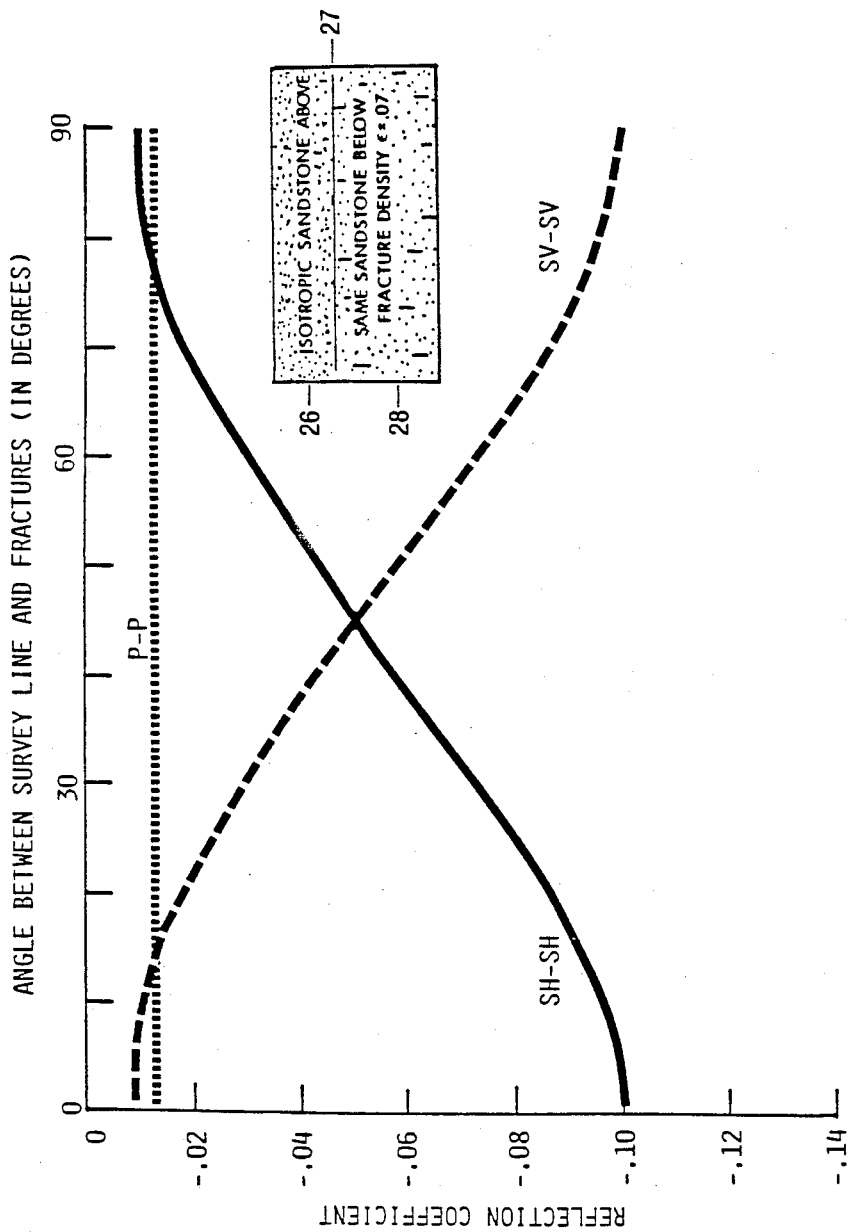

As a second example of the AFI effect, FIG. 6 shows the reflection coefficients for a case with no lithology change across an interface 27 between layers 26 and 28. There is an impedance contrast, however, because of the presence of gas-filled fractures (e=0.07) in the lower bed 28. This leads to a very weak P wave reflection as shown ($R_P \cong 0.01$), with no azimuthal dependence at normal incidence. Likewise, there is only a weak reflection of the SV wave (parallel to the fractures) and of the SH wave (perpendicular to the fractures). However, there are substantial reflections from both shear types at other angles; this orientation dependence of shear reflections constitutes the AFI.

Note that, in this case, the strongest SH reflections occur on the survey line parallel to the fractures, whereas in FIG. 5, the strongest SH reflections occurred on the survey line perpendicular to the fractures. This difference is due to the differing characteristics of the overlying bed in the two cases. That is, the AFI may constitute either a "one-way" bright spot, or a "one-way" dim spot, depending on the intrinsic, unfractured impedances of the beds on either side of an interface. Note also that the negative coefficient implies a polarity change.

Figure 7:
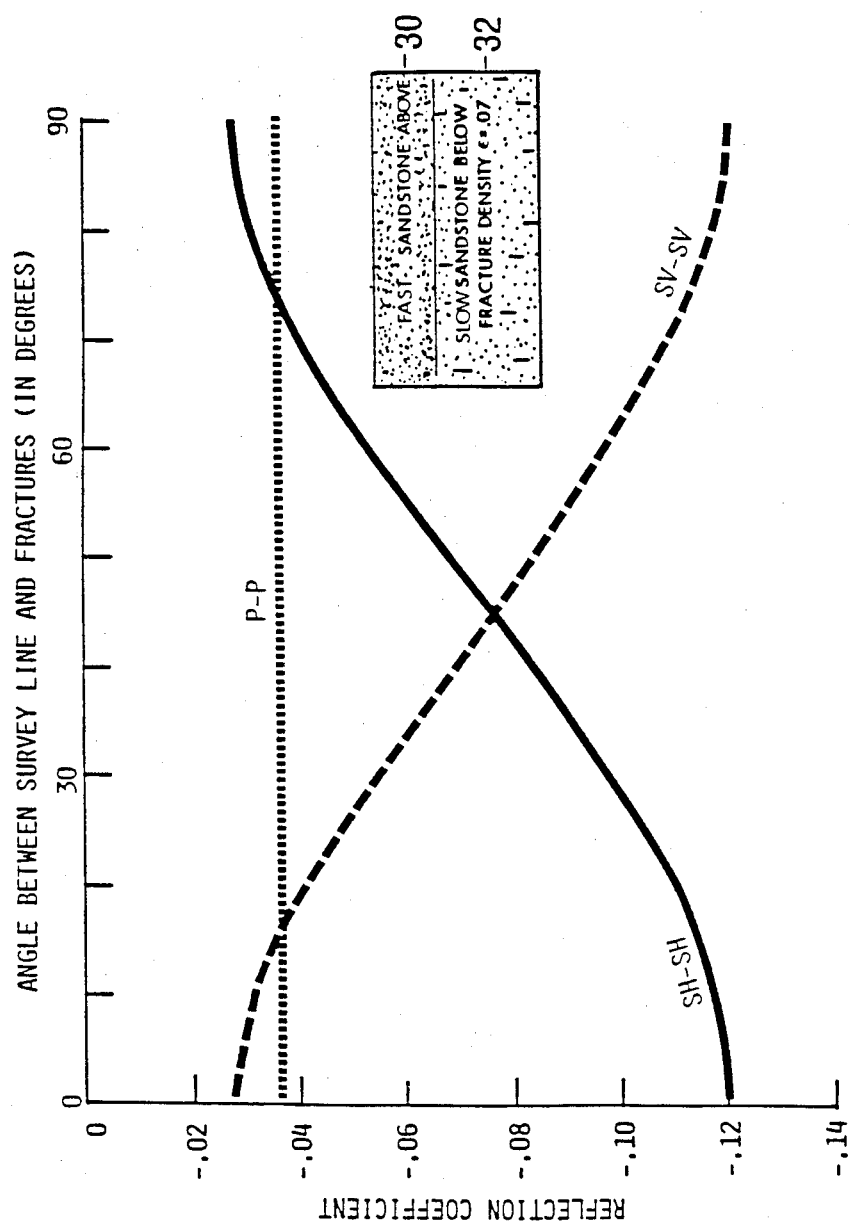

Finally, FIG. 7 shows the theoretical reflection coefficients for a case, where an overlying bed 30 has an intrinsically faster interval velocity than a lower bed 32. Again, there is an orientation dependence, but it changes from a moderate reflection to a stronger reflection (both with a polarity change). This occurs because the fractures serve to soften the lower unit (which is already softer than the upper unit) when the shear is properly polarized with respect to the fractures. Because all orientations show good reflections, this AFI may be harder to detect than the previous ones.

IV. Field Technique Employing Two Orthogonal Polarizations of Shear Waves for the Direct Detection of Fractured Reservoir Rock This section relates to a seismic acquisition, processing, and interpretation technique which provides a method for detection of the presence and/or extent of fractured rocks in the subsurface, using surface seismic recordings. Prior to the present invention, the detection of fractured reservoirs by seismic methods was not satisfactorily performed. If fractured reservoirs are identified and mapped from the surface using seismic techniques, the viability of searching for hydrocarbon accumulation in fractured reservoirs is greatly enhanced.

The method of this Section exploits the predicted (Sections II, III) azimuthal anisotropy present in the elastic media with oriented fractures. This class of fractures will be referred to as simply azimuthally oriented fractures or fractures. A rock with azimuthally oriented fractures possesses elastic properties of an anisotropic rock, manifested by velocities of propagation which depend upon the direction of propagation and of the particle motion of the elastic wave propagating in such a rock.

A. Seismic Acquisition

Figure 8:
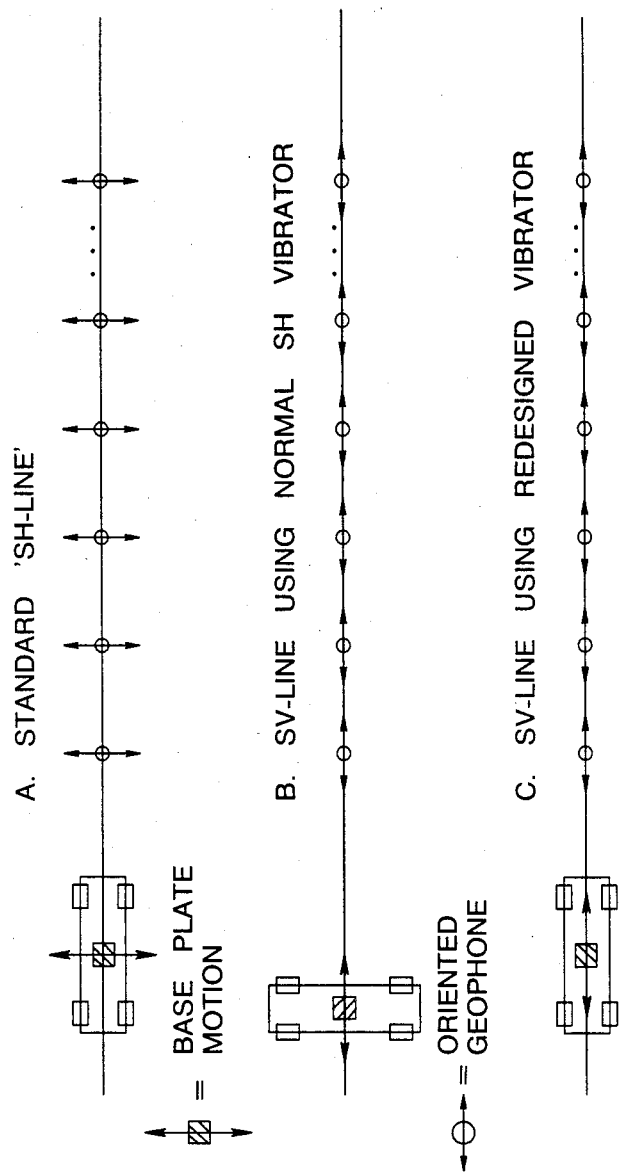
FIG. 8 is a schematic view of a seismic data acquisition technique for use with the present invention.

The source for generating the SH and SV data can be a currently available "shear vibrator," in which the base plate motion for the SH is perpendicular to the direction of the seismic survey line, see FIG. 8.

This same vibrator, either by turning the vehicle crosswise to the line, or by redesigning the vibrator such that motion of the base-plate is along the direction of travel of the vehicle, can be used to induce inline (SV) shearing motion along the seismic survey line. It is highly preferable that a seismic source be of the polarized shear vibrator type instead of the explosive source type since the shear vibrator source generates downwardly propagating waves containing primarily polarized shear motion and polarized shear elastic waves.

The response to the SH source and the SV source will be recorded on matched geophones sensitive to horizontal ground motion oriented to record this same displacements as generated by the shear vibrator. That is, for source vibrations normal to the direction of the survey line (SH, case A of FIG. 8), horizontal geophones will be oriented to detect motion perpendicular to the survey line as is currently done for the SH case. For the SV source, the geophones will be oriented to detect motion parallel to the direction of the seismic survey line.

Other than the orientation of the vibrators and the geophones, data acquisition is carried on in the same manner as usual for conventional CDP data gathering. The results of the desired acquisition procedure will form two separate seismic surveys (1) the SH case and (2) the SV case. The seismic lines of profile are oriented substantially parallel and perpendicular to the oriented fracture surfaces. For completeness, it is also preferable that a P-wave seismic survey line be recorded.

B. Processing

The three sets of data, namely, the P-wave line, the SV line, and the SH line can be processed using the standard CDP techniques of correcting for statics, careful velocity analysis, and correction or normal moveout, sorting into sets of data traces, and then summing that set to create a stacked section for the P-wave line, SV line and SH line. The sections resulting from careful processing expose the seismic response (the reflectivity and the travel times) for P-waves, and two polarizations of shear wave, namely, SV and SH.

C. Interpretation and Deduction

The velocity of propagation in an anisotropic medium varies as a function of the direction of particle motion of the wave, as well as the propagation direction. A vertical direction of propagation has been assumed in the following interpretation such that CDP techniques do produce a good approximation to vertical propagation while reducing the presence of noise and multiple reflections. As such, only those variations due to particle motion are discussed below.

The change in the velocity, resulting from the anisotropy induced by the oriented fractures, manifests itself on the seismic sections in two ways:

(1) the time difference between two reflecting boundaries, bounding such an anistropic media, varies according to the particular motion of the wave traversing the media;

(2) as a result of this velocity variation, the reflection coefficient; i.e., the strength of the amplitude of the event reflected from those boundaries reflects the velocity contrast experienced at the boundary.

In situations where shear waves encounter oriented fractures, and particle motion is parallel to the dominant fracture orientation, the shear modulus is high. In particular, it is higher than the shear modulus for orthogonal polarization, in which the particle motion is perpendicular to the mean fracture orientation. Thus, the shear wave polarized parallel to the mean fracture orientation has a faster shear velocity of propagation than a shear wave with particle motion perpendicular to mean fracture direction. One is therefore, able to deduce the fracture zone and the orientation by comparing the two shear polarizations obtained from the SV and SH acquisition.

Since the response for the SV and SH polarizations changes as a function of the anisotropy induced by the oriented fractures, this difference can be used with the present invention to deduce whether fracturing is indeed present and to identify the extent of the fracture zone.

V. Field Technique Using P and Shear Seismic Data for the Detection of Fracture Density This section relates to a seismic acquisition, processing, and interpretation technique which has been successfully used to detect fracture density in a proven fractured gas reservoir. This techique detects "open" fractures, meaning those not plugged or mineral-filled, which are preferentially oriented in some azimuthal direction. An "open" fracture is defined to mean one "filled with oil, gas, or brine." This interpretive technique is important to fracture-dependent fields because it can delineate the presence, azimuth, and lateral extent of the zones of highest fracture density on the seismic survey line. When these zones are identified using surface measurements, the success ratio in fracture exploration is improved.

P and SH data are both collected, using conventional field techniques (see FIGS. 9 and 10) on each of two approximately orthogonal seismic survey lines of profile. The seismic survey lines are oriented approximately parallel to, and perpendicular to, the suspected fracture azimuthal orientation. Purposefully gathering carefully oriented orthogonal sets of P and SH survey lines for the purpose of detecting azimuthally oriented fractures is a new concept with the present invention. There is an acceptable window for the survey lines' orientation (as can be seen by examining FIG. 9). At the SH seismic survey line tiepoint, if azimuthally oriented fractures are present, then the seismic survey line parallel to the fractures will exhibit the greater shear transit time between correlative reflectors. The different transit times at a tiepoint indicate SH velocities which vary with the azimuth of survey line, which is defined as SH velocity anisotropy.

This measurement of shear velocity anisotropy represents detection of oriented fractures at and above the depth of the reflectors. Oriented fractures weaken a rock preferentially. The stronger the rock (i.e., the more resistant it is to shear stress), the higher the shear velocity becomes. The weaker the rock to shear stress, the lower the shear velocity is. This preferential weakening is utilized with the present invention by seeking a difference in the shear velocity with azimuth to search for oriented fractures.

The method of interpretive technique includes the P wave reflectors using a checkshot survey, and/or synthetic seismograms. The reflections are correlated from P and SH using character similarity, and/or direct shear velocity information. The shear interval transit time ($\Delta t_s$) and the P interval transit times ($\Delta t_p$) between correlative reflectors which delimit relatively uniform lithologic section are then measured (preferably by computer).

The effect of fractures on P and SH data must be understood in order to analyze the data. Vertical fractures reduce the velocity of a vertically incident SH wave only when the shear particle motion has a significant component perpendicular to the crack face (see Section III above). Vertical fractures have little effect on a vertically incident P wave, since the P wave particle motion of a vertically incident P wave is not perpendicular to the crack face. When P wave particle motion has a component perpendicular to crack faces, then the P wave senses their presence. When the shear wave is affected by fractures, its velocity will decrease (i.e., $\Delta t_s$ will increase). The fractures which will affect the shear wave are nearly vertical, and oriented approximately parallel to the direction of the SH seismic survey line.

At the tiepoint of two shear and P survey lines, this analysis provides a direct measure of shear velocity anisotropy, thus providing a qualitative measurement of the crack or fracture density. Away from the tiepoint(s), an increase of $\Delta t_s$ (i.e., a decrease in shear velocity), with no change in $\Delta t_p$ causes an increase in the velocity ratio ($V_p/V_s$) of the P and SH wave velocities which could indicate a higher fracture density, or a change in lithology.

As mentioned above, the anisotropic effect of oriented fractures on SH data is most evident when the fractures contain oil, gas, or brine. Should the fractures be filled with gouge, calcite, quartz, etc. (i.e., any mineral or rock filling), then the anisotropic effect is expected to be below the noise level of the data and one would not measure an anisotropic effect.

A large anisotropic effect does not necessarily imply large fracture porosity; however, it does imply large fracture density (large fracture porosity distribution). A large fracture density does not a priori guarantee economic production of hydrocarbons: there may be only water present, the fractures (though long in extent) may be too thin to allow fluid flow, etc. However, a zone exhibiting some fracture density is less risky to drill than a zone exhibiting no fracture density. The more information one has about the fractures needed or typical for an area (e.g., the fracture aspect ratio), the more reliable the interpretation becomes.

In addition to a shear interval transit time anomaly, which yields a $V_p/V_s$ anomaly, fractured rocks are also capable of giving rise to a reflection amplitude anomaly (see Section II). The amplitude anomaly is due to the change in the impedance contrast (FIG. 10).

Figure 10:
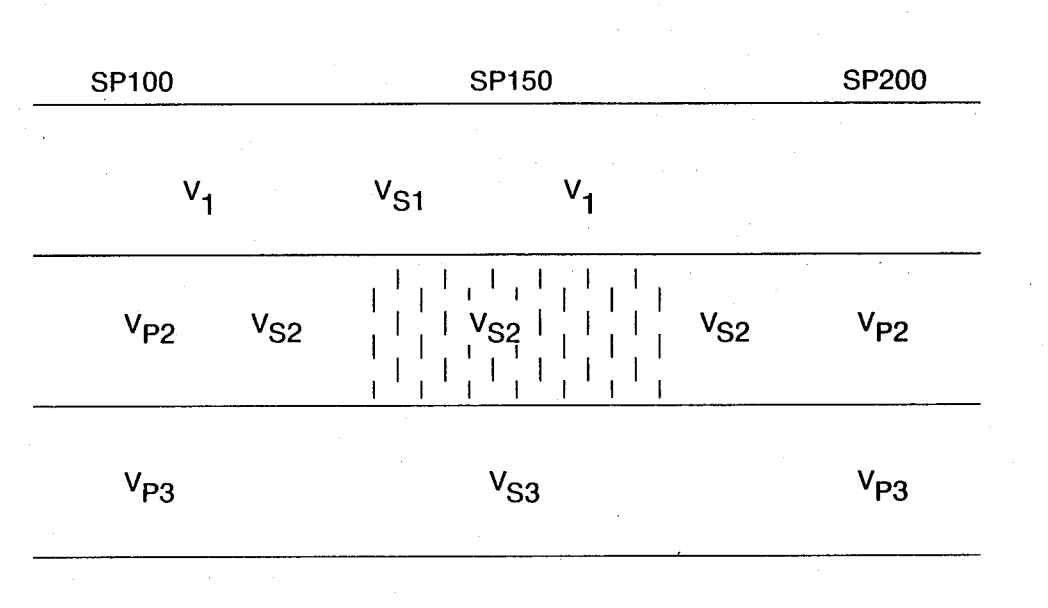

In the conceptual sketch of FIG. 10, a region of fractured rocks is shown in formation 2 underground location SP 150, with its changed shear velocity. The impedance contrast is different at SP 150 than at SP 100 or SP 200. This difference can be manifested as a change in polarity, a change in interval transit times, or a change in phase or a change in "reflection character" (some combination of phase and frequency change), depending upon the densities and velocities of the specific rocks involved.

VI. Other Applications

Another application or concept of the present invention is in reservoir engineering. Petroleum engineers need to know the presence, azimuth, and extent of the fracture systems (natural and/or man-made) in reservoirs. This information can be obtained with the above technique of P and shear data acquisition and interpretation (in good data quality areas). To collect P and shear (with two polarizations) lines before and after fracturing a well or perforating other enhanced oil recovery procedures is a new approach to a long-standing, difficult problem of determining fracture density.

With remote detection of higher fracture density possible, the success ratio of fracture porosity of fracture enhanced plays should increase. Reservoir engineers will be able to extract critical data concerning the azimuth and extent of fractures in their wells and fields. This new use of shear and P data to detect fracture density of the present invention will thus help both exploration and production.

VII. Illustration of Technique

Figure 9:
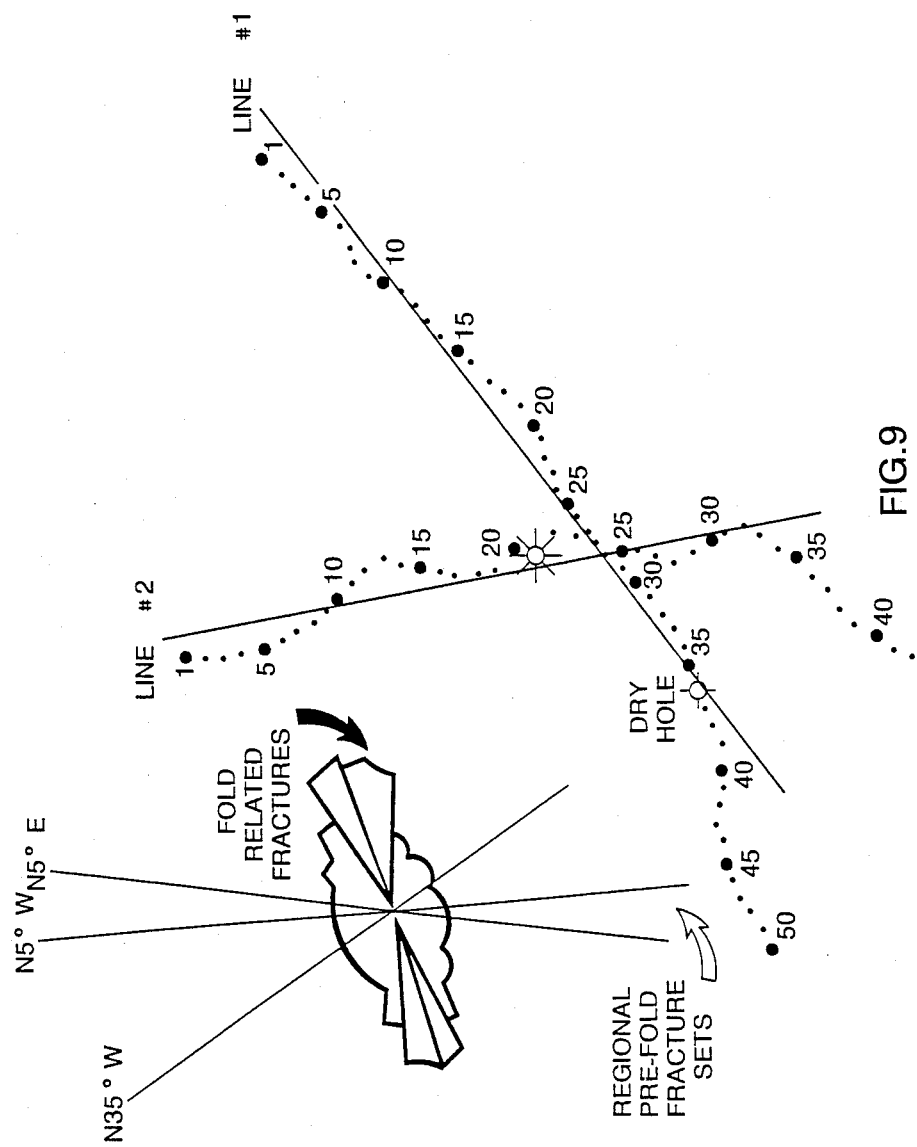
FIG. 9 is a diagram of seismic shot point locations along two intersecting seismic lines of profile with a schematic diagram of fractures found to be present in the area.
Figure 11:
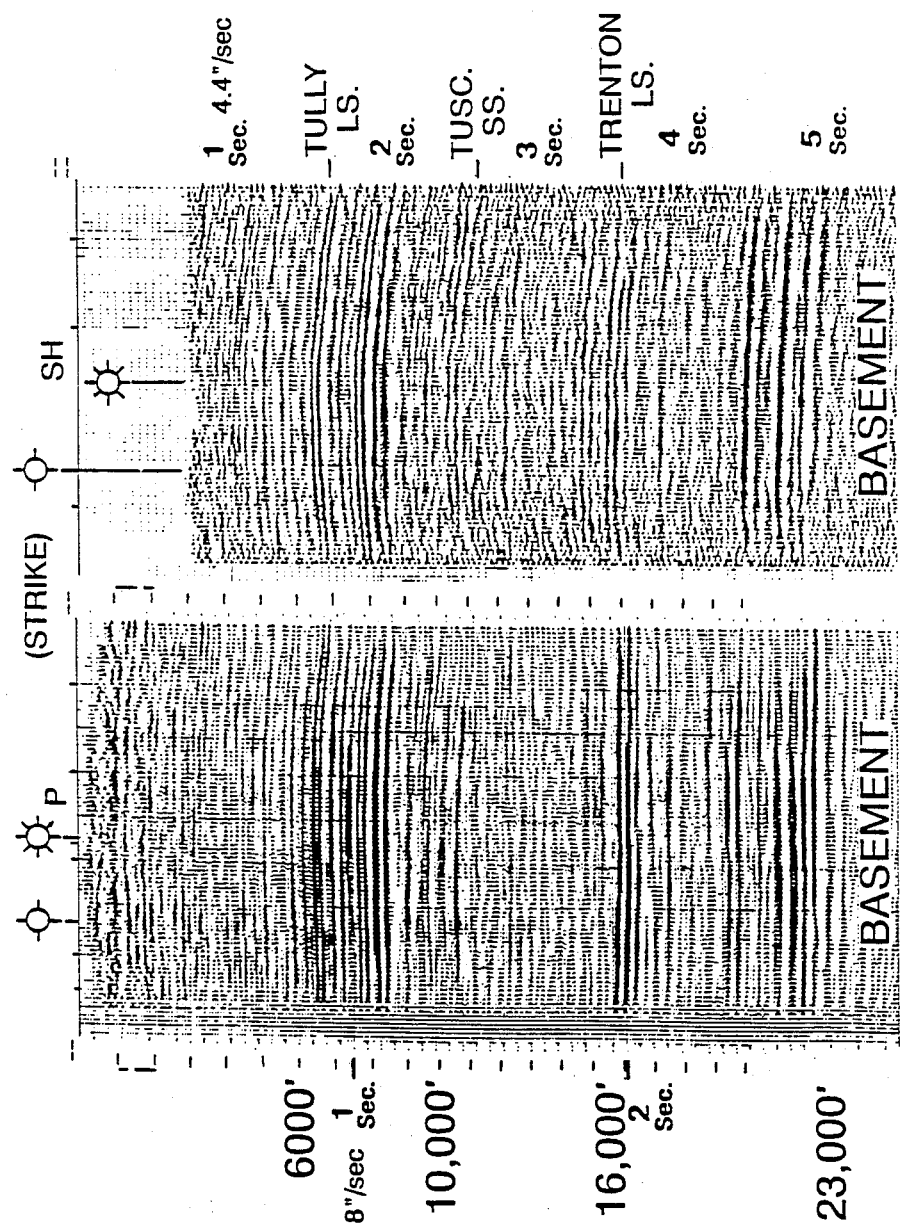
Figure 12:
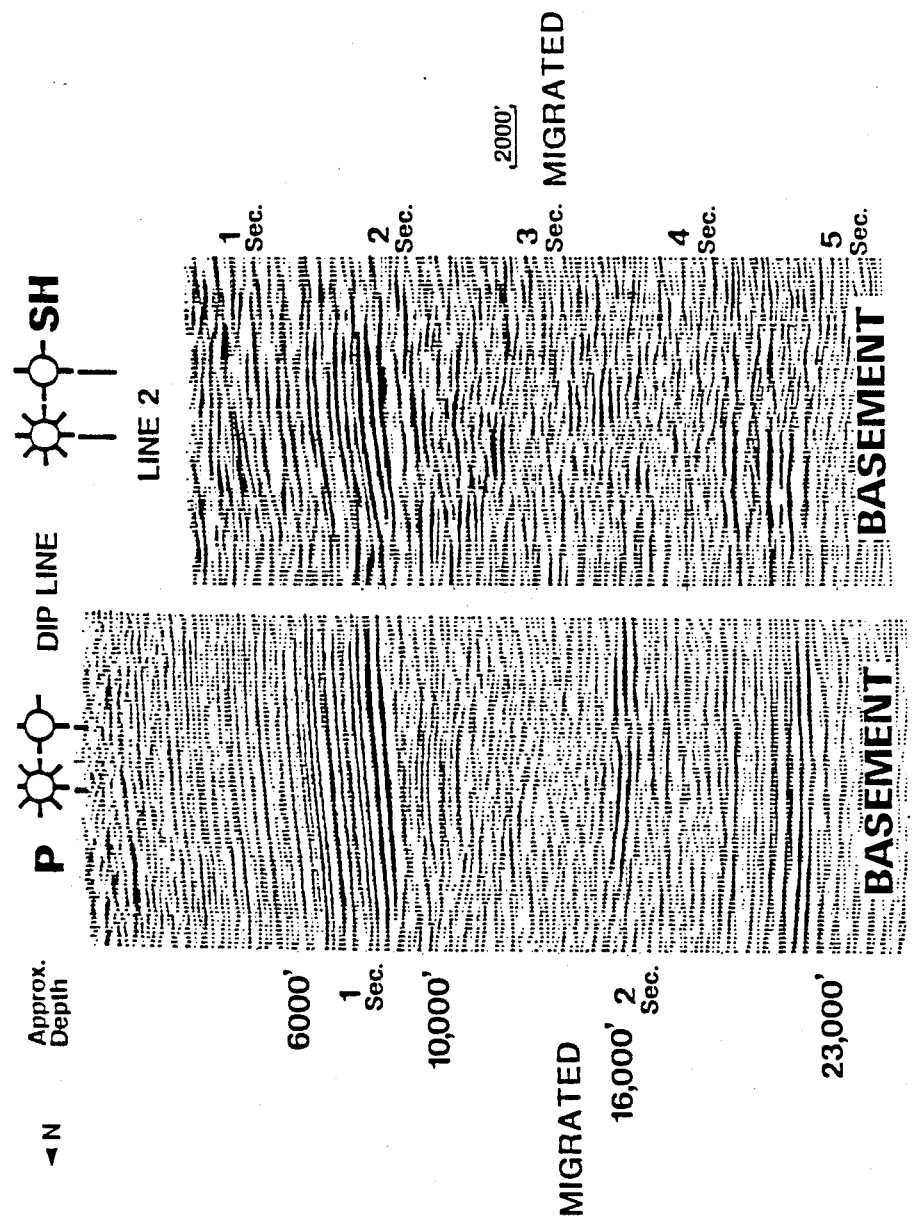
Figure 13:
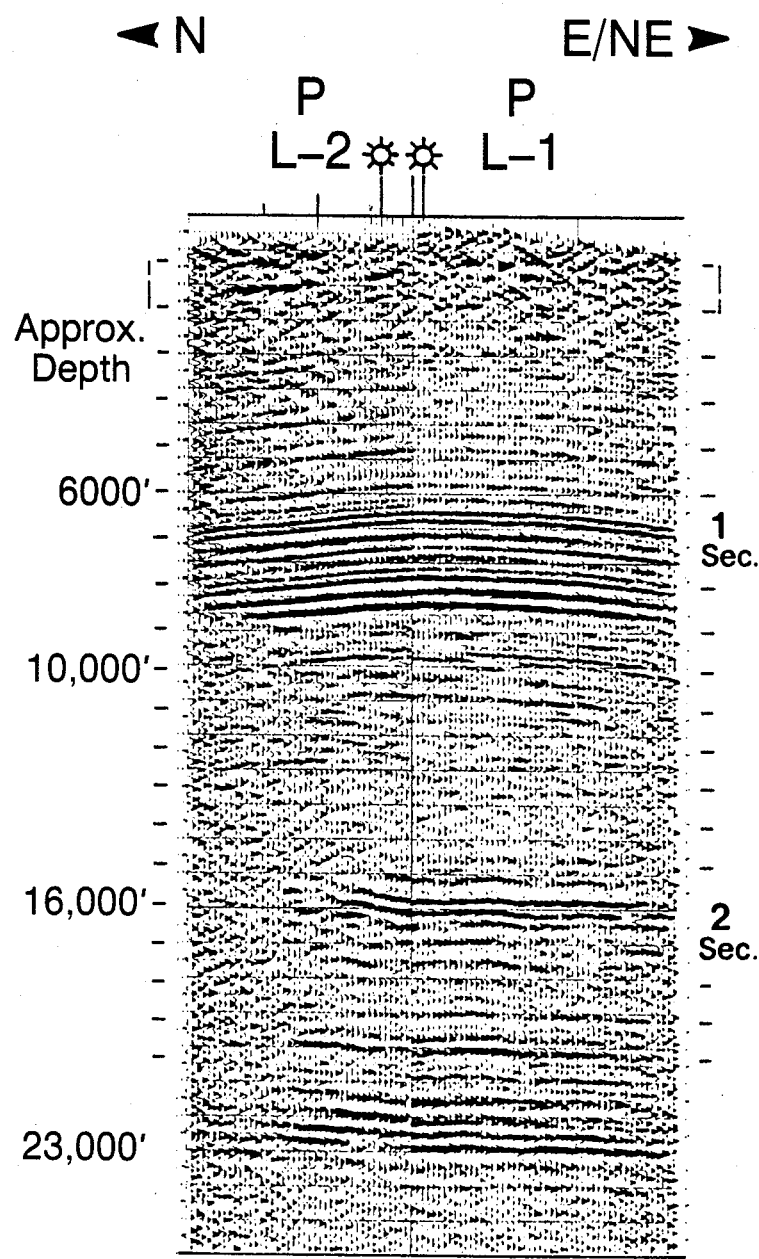
Figure 14:
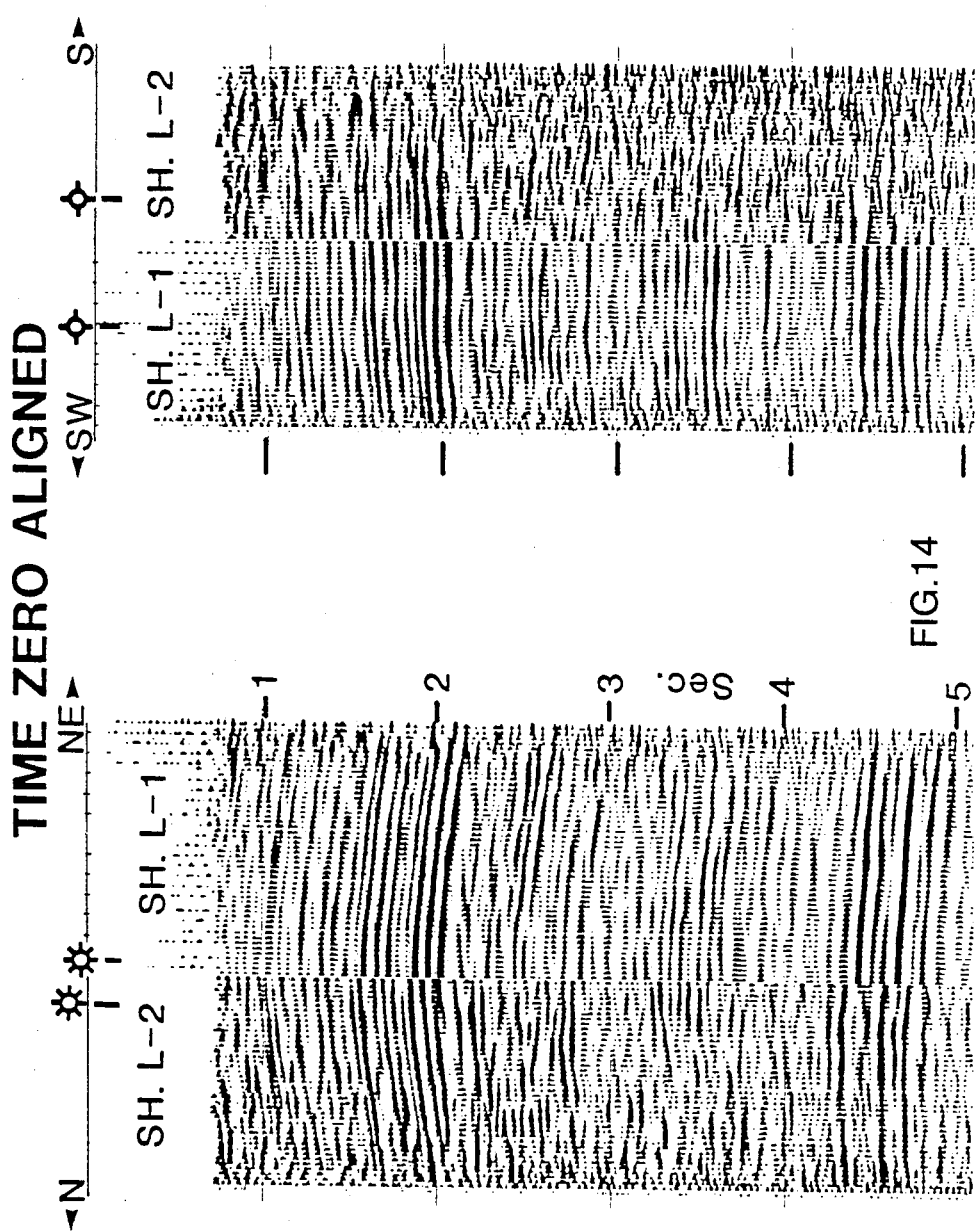
Figure 15:
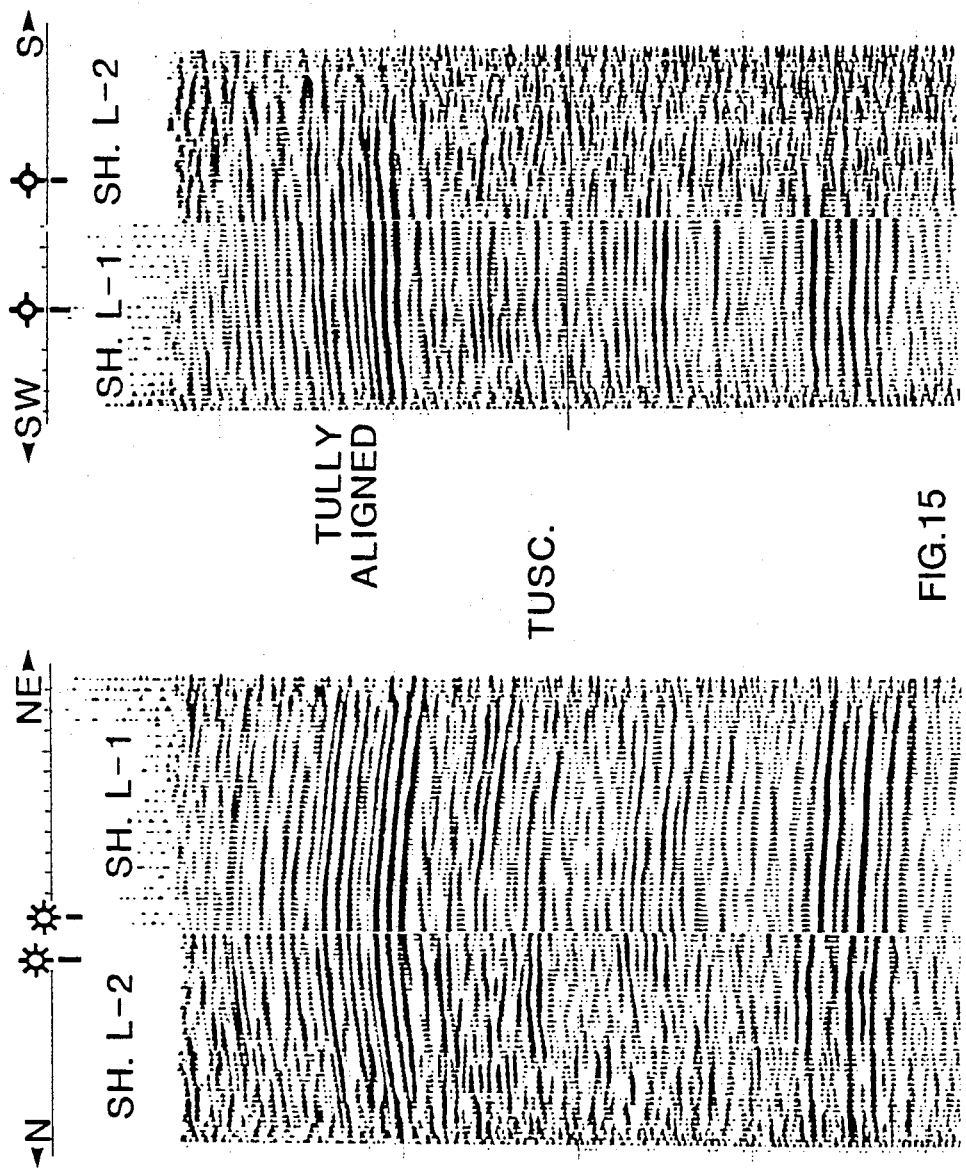
Figure 16:
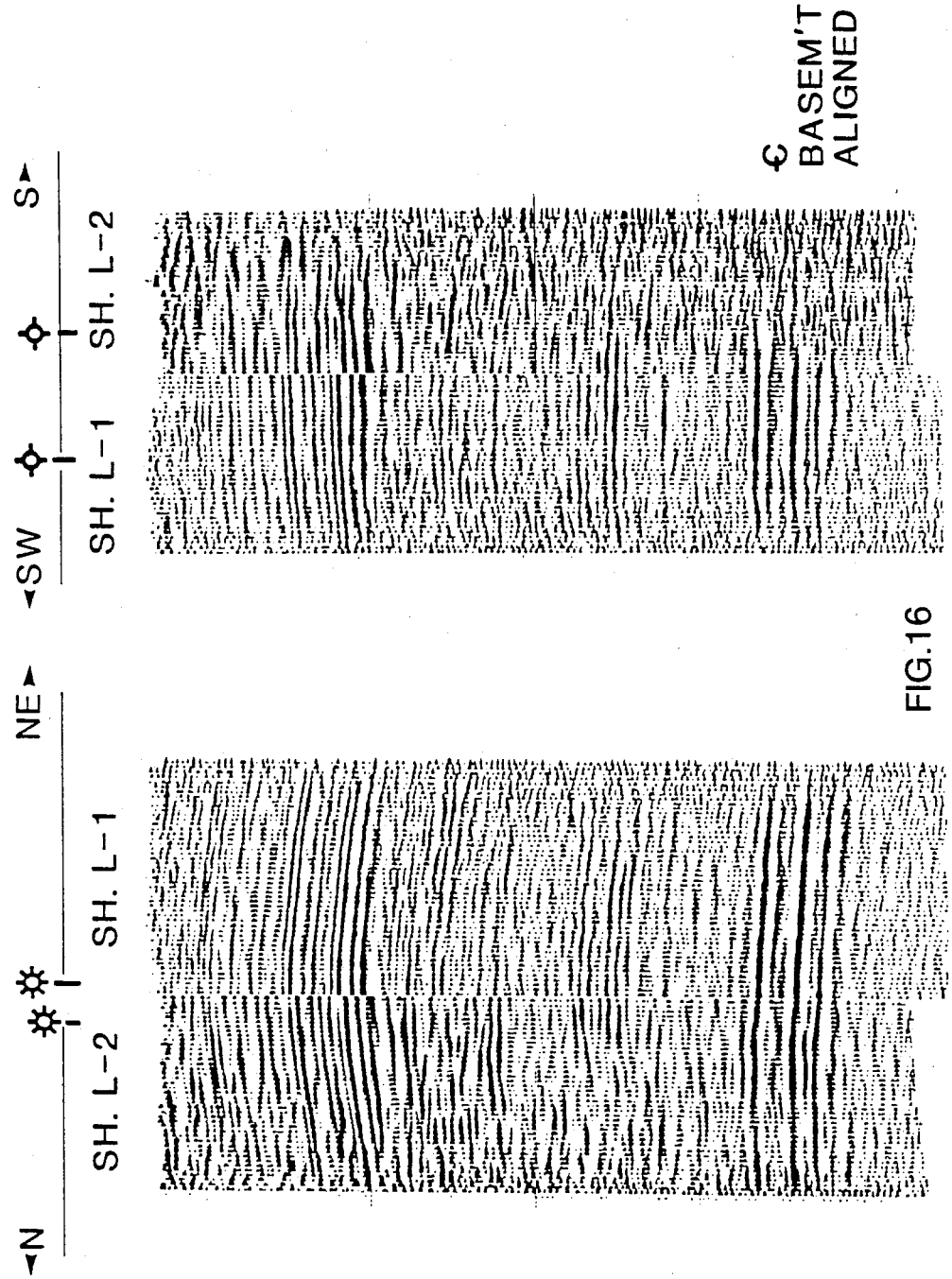
Figure 17:
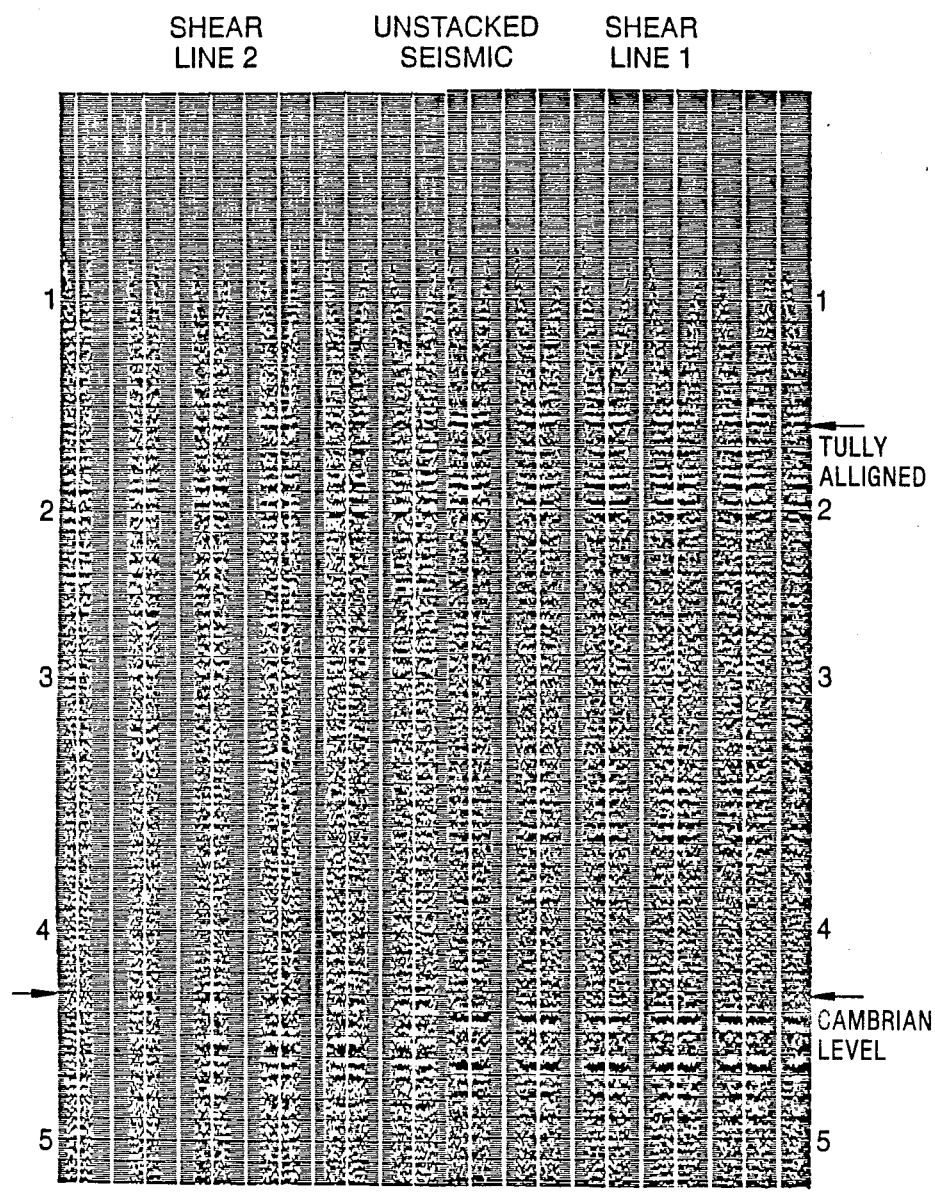

Data obtained at the site shown in FIG. 9, illustrate shear velocity anisotropy, which we attribute to oriented fractures. The P and SH data for the two survey lines are presented in FIGS. 11 and 12. The P wave data, along both survey lines as shown in FIG. 13, tie together indicating no measurable P velocity anisotropy. Whereas, the SH data mistie dynamically (time variant) at the tiepoint of the survey lines (FIGS. 14, 15, and 16). FIGS. 14, 15, and 16 show the data sets aligned at different points in time, each of which causes misalignment at the other points. With reflector 1 aligned in FIG. 17, these data show a greater travel time to the Cambrian level on survey line 1 than on survey line 2. Note also that the data is properly corrected for moveout and statics. The greater SH interval transit times on SH survey line 1, causing the dynamic mistie, are attributed to E-W oriented fractures. In this area, the Alleghenian orogeny in the late Paleozoic caused extensive E-W oriented fractures to form; these fractures have been mapped and documented. The E-W fold-caused fractures in outcrop are pervasive, widespread, and show little or no width to the naked eye, but are extremely long (2 to 20 feet). A very small aspect ratio is indicated, which would cause a measurable anisotropic effect.

The target fractures are a N-S set of regional, quartz-propped (open), gas-filled fractures. These fractures would be sensed on the N-S survey line (line 2). By examining the tiepoint at the level of Reflector 2 (FIG. 18), one can check for traveltime and reflection coefficient anomalies.

At the tiepoint, Reflector 2 for SH reflection is dim on survey line 2 and bright on survey line 1 (circled area, FIG. 18). This relative true amplitude section clearly shows the difference in amplitude at the tiepoint. The dimmer reflection on the N-S survey line 2 is attributed to N-S fractures decreasing the shear impedance contrast, from overlying shale to underlying fractured sandstone.

At the level of Reflector 2, these N-S fractures are evidently present in greater density than the E-W fractures. The existence of the N-S fractures at this level and their correlation with successful wells has been well established. This demonstrates the exploration application by using (1) the slowdown of shear waves in fractures zones and (2) the shear velocity anisotropy at the tiepoint.

The foregoing disclosure and description of the invention are illustrative and explanatory thereof, and various changes in the size, shape and materials, as well as in the details of the illustrated construction may be made without departing from the spirit of the invention.

We claim:

1. A method of surveying the earth's subsurface formations to determine azimuthal variations in the earth's subsurface comprising the steps of:
   (a) imparting shear wave seismic energy into the earth with a first seismic source polarized in a first direction along a first seismic line of profile;
   (b) recording the reflected shear wave seismic energy with a first geophone having a polarization matching the polarization of the first seismic source to produce a first shear wave record;
   (c) imparting shear wave seismic energy into the earth with a second seismic source polarized in a second direction along a second seismic line of profile;
   (d) recording the reflected shear wave seismic energy with a second geophone having a polarization matching the polarization of the second seismic source to produce a second shear wave record;
   (e) processing the first and second shear wave records to produce a first and second shear wave section; and
   (f) comparing the first and second shear wave seismic sections to determine azimuthal variations in the earth's subsurface.

2. The method of claim 1, further including the steps of:
   (a) imparting shear wave seismic energy into the earth with the first seismic source polarized perpendicular to the first seismic line of profile; and
   (b) imparting shear wave seismic energy into the earth with the second seismic source polarized perpendicular to the second seismic line of profile.

3. The method of claim 2 wherein the first and second seismic lines of profile cross.

4. The method of claim 3 wherein the first and second seismic lines of profile are substantially orthogonal.

5. The method of claim 1, further including the steps of:
   (a) imparting shear wave seismic energy into the earth with the first seismic source polarized parallel to the first seismic line of profile; and
   (b) imparting shear wave seismic energy into the earth with the second seismic source polarized parallel to the second seismic line of profile.

6. The method of claim 5 wherein the first and second seismic lines of profile cross.

7. The method of claim 6 wherein the first and second seismic lines of profile are substantially orthogonal.

8. The method of claim 1 wherein the first and second seismic lines of profile are substantially collinear.

9. The method of claim 8 wherein the first and second seismic source polarizations are orthogonal.

10. The method of claim 1 further including the step of:
    conducting a compressional wave seismic survey along the first and second seismic lines of profile.

11. The method of claim 1 further comprising the step of:
    determining fracture density from the azimuthal variations in the earth's subsurface.

12. The method of claim 1, wherein:
    (a) said step of processing the first and second shear wave records includes determining the arrival times of shear wave events and
    (b) said step of comparing the first and second seismic sections includes determining differences in shear wave event arrival times in the two shear wave sections.

13. The method of claim 1, wherein:
    (a) said step of processing the first and second shear wave records includes determining reflection amplitudes for events in the shear wave sections; and
    (b) said step of comparing the first and second seismic sections includes comparing reflection amplitudes for corresponding events in the two shear wave sections.

14. The method of claim 1 further including the step of:
    locating regions of oriented fractures within the earth's subsurface formations.

15. The method of claim 14 further including the step of:
   locating one of the seismic lines of profile substantially parallel to the orientation of the oriented fractures.

16. The method of claim 1 wherein:
   said step of comparing the first and second seismic sections includes comparing waveforms in corresponding events in the two shear wave sections.

17. A method of surveying subsurface earth formations along two crossing seismic lines to investigate azimuthal variations in subsurface formations, comprising the steps of:
   (a) imparting shear wave seismic energy into the earth with a first seismic source polarized in a first direction at selected points along a first seismic line of profile;
   (b) recording the response of the earth formations to the shear wave seismic energy at selected points on the first seismic line of profile with a geophone having a polarization matching the polarization of the first seismic source;
   (c) imparting shear wave seismic energy into the earth with a second seismic source polarized in a second direction at selected points along a second seismic line of profile which crosses the first seismic line of profile;
   (d) recording the response of the earth formations to the shear wave seismic energy at selected points on the second seismic line of profile with a geophone having a polarization matching the polarization of the second seismic source; and
   (e) processing both recorded responses to form a sher wave seismic section for each of the first and second seismic lines of profile to determine the presence of fractures and their orientation and density in the subsurface formations.

18. The method of claim 17 further including the steps of:
   (a) imparting compressional wave seismic energy into the earth with a third seismic source at selected points along the first seismic line of profile;
   (b) recording the response of the earth formations to the compressional wave seismic energy at selected points on the first seismic line of profile;
   (c) imparting compressional wave seismic energy into the earth with a fourth seismic source at selected points along the second seismic line of profile;
   (d) recording the response of the earth formations to the compressional wave seismic energy at selected points on the second seismic line of profile; and
   (e) processing the recorded responses to form a compressional wave seismic section for each of the first and second seismic lines of profile.

19. The method of claim 17 wherein the step of processing both recorded responses includes determining the presence of fractures and their orientation and density at the intersection of the two seismic lines.

20. The method of claim 17, wherein the crossing seismic lines of profile are substantially orthogonal to each other along the earth's surface.

21. The method of claim 17, wherein the first and second seismic lines intersect over an area where oriented fractures are suspected to be present.

22. The method of claim 17, wherein one of the seismic lines of profile is located substantially parallel to the suspected orientation of the fractures.

23. The method of claim 17, wherein one of the seismic lines of profile is located substantially perpendicular to the suspected orientation of the fractures.

24. A method of surveying subsurface earth formations along a single seismic line of profile to investigate azimuthal variations in the subsurface formations; comprising the steps of:
   (a) imparting shear wave seismic energy into the earth with a first seismic source polarized in a first direction at selected points along the seismic line of profile;
   (b) recording the response of the earth's formations to the shear wave seismic energy at selected points along the seismic line of profile with a geophone having a polarization matching the polarization of the first seismic source;
   (c) imparting shear wave seismic energy into the earth with a second seismic source polarized in a second direction at selected points along the seismic line of profile;
   (d) recording the response of the earth's formations to the shear wave seismic energy at selected points along the seismic line of profile with a geophone having a polarization matching the polarization of the second seismic source; and
   (e) processing the recorded response to produce two shear wave seismic sections along the seismic line of profile to determine the presence of fractures and their orientation and density in the formation.

25. The method of claim 24 further including laying out the seismic line of profile substantially parallel to the suspected orientation of the fractures.

26. The method of claim 24 further including laying out the seismic line of profile substantially perpendicular to the suspected orientation of the fracture.

27. The method of claim 24 further including:
   (a) imparting compressional wave seismic energy into the earth with a third seismic source at selected points along the seismic line of profile;
   (b) recording the response of the earth's formations to the compressional wave seismic energy at selected points along the seismic line of profile; and
   (c) processing the response to form a compressional wave seismic section.

28. The method of claim 24 wherein the first and second polarizations of the seimic first and second seismic sources are mutually orthogonal.

29. The method of claim 28 wherein the first and second polarizations of the seismic first and second seismic sources are mutually orthogonal with respect to the seismic line of profile.

30. A method for acquiring seismic data in locations having azimuthally anisotropic subsurface formations comprising the following steps:
   (a) imparting shear wave seismic energy into the earth with a first seismic source polarized in a first direction along a first seismic line of profile;
   (b) recording the earth's response to the imparted shear wave seismic energy with a first geophone having a polarization matching the polarization of the first seismic source to produce a first shear wave record;
   (c) imparting shear wave seismic energy into the earth with a second seismic source polarized in a second direction along a second seismic line of profile; and
   (d) recording the earth's response to the imparted shear wave seismic energy with a second geophone having a polarization matching the polarization of the first seismic source to produce a second shear wave record.

31. The method of claim 30 further including the steps of:
   (a) processing the first and second shear wave recod to produce a first and second shear wave section; and
   (b) comparing the first and second shear wave seismic sections to determine azimuthal variations in the earth's subsurface.

32. The method of claim 30 further including steps of:
   (a) imparting shear wave seismic energy into the earth with the first seismic source polarized perpendicular to the first seismic line of profile; and
   (b) imparting shear wave seismic energy into the earth with the second seismic source polarized perpendicular to the second seismic line of profile.

33. The method of claim 32 wherein the first and second seismic lines of profile cross.

34. The method of claim 33 wherein the first and second seismic lines of profile are substantially orthogonal.

35. The method of claim 30 further including the steps of:
   (a) imparting shear wave seismic energy into the earth with the first seismic source polarized parallel to the first seismic line of profile; and
   (b) imparting shear wave seismic energy into the earth with the second seismic source polarized parallel to the second seismic line of profile.

36. The method of claim 35 wherein the first and second seismic lines of profile cross.

37. The method of claim 36 wherein the first and second seismic lines of profile are substantially orthogonal.

38. The method of claim 30 wherein the first and second seismic lines of profile are substantially collinear.

39. The method of claim 38 wherein the first and second shear wave seismic source polarizations are orthogonal.

40. The method of claim 30 further including the steps of:
   (a) imparting compressional wave seismic energy into the earth with a third seismic source along the first and second seismic lines of profile; and
   (b) recording the earth's response to the imparted compressional wave seismic energy with a third geophone adapted to detect compressional waves to produce a compressional wave record.

41. A method of surveying azimuthally subsurface earth formations along two crossing seismic lines of profile comprising the steps of:
   (a) imparting shear wave seismic energy into the earth with a first seismic source polarized in a first direction at selected points along a first seismic line of profile;
   (b) recording the response of the earth formations to the shear wave seismic energy at selected points on the first seismic line of profile with a geophone having a polarization matching the polarization of the first seismic source;
   (c) imparting shear wave seismic energy into the earth with a second seismic source polarized in a second direction at selected points along a second seismic line of profile which crosses the first seismic line of profile; and
   (d) recording the response of the earth formations to the shear wave seismic energy at selected points on the second seismic line of profile with a geophone having a polarization matching the polarization of the second seismic source.

42. The method of claim 41 further including the steps of:
   processing both recorded shear wave responses to form a shear wave seismic section for each of the first and second seismic lines of profile to determine the presence of fractures and their orientation and density in the subsurface formations.

43. The method of claim 41 further including the steps of:
   (a) imparting compressional wave seismic energy into the earth with a third seismic source at selected points along the first seismic line of profile;
   (b) recording the response of the earth formations to the compressional wave seismic energy at selected points on the first seismic line of profile;
   (c) imparting compressional wave seismic energy into the earth with a fourth seismic source at selected points along the second seismic line of profile; and
   (d) recording the response of the earth formations to the compressional wave seismic energy at selected points on the second seismic line of profile.

44. A method of surveying azimuthally anisotropic subsurface earth formations along a single seismic line of profile comprising the steps of:
   (a) imparting shear wave seismic energy into the earth with a first seismic source polarized in the first direction at selected points along a seismic line of profile
   (b) recording the response of the earth's formations to the shear wave seismic energy at selected points along the seismic line of profile with a geophone having a polarization matching the polarization of the first seismic source;
   (c) imparting shear wave seismic energy into the earth with a second seismic source polarized in a second direction at selected points along the seismic line of profile; and
   (d) recording the response of the earth's formations to the shear wave seismic energy at selected points along the seismic line of profile with a geophone having a polarization matching the polarization of the second seismic source.

45. The method of claim 41 further including the step of:
   (a) processing the recorded shear wave responses to produce two shear wave seismic sessions along the seismic lines of profile to determine the presence of fractures and their orientation and density in the formation.

46. The method of claim 44 further including the steps of:
   (a) imparting compressional wave seismic energy into the earth with a third seismic source at selected points along the seismic line of profile;
   (b) recording the response of the earth's formations to the compressional wave seismic energy at selected points along the seismic line of profile; and
   (c) processing the compressional response to form a compressional wave seismic section.

47. The method of claim 44 wherein the first and second polarizations of the seismic first and second sources energy are mutually orthogonal.

48. The method of claim 47 wherein the first and second polarizations of the the first and second sources seismic energy are mutually orthogonal with respect to the seismic line of profile.

49. A method for determining azimuthal variations in the earth's subsurface comprising the steps of:
 (a) displaying a first record of shear wave seismic energy imparted into the earth by a shear wave seismic source polarized in a first direction along a first seismic line of profile and received by a first geophone havng a matched polarization;
 (b) displaying a second record of shear wave seismic energy imparted into the earth by a shear wave seismic source polarized in a second direction along a second seismic line of profile and received by a second geophone having a matched polarization; and
 (c) comparing the first and second records of shear wave seismic energy to determine azimuthal variations in the earth's subsurface.

50. A method for determining azimuthal variations in the earth's subsurface comprising the steps of:
 (a) displaying a first record of shear wave seismic energy imparted into the earth by a shear wave seismic source polarized in a first direction along a seismic line of profile and received by a first geophone having a matched polarization;
 (b) displaying a second record of shear wave seismic energy imparted into the earth by a shear wave seismic source polarized in a second direction along the seismic line of profile and received by a second geophone having a matched polarization; and
 (c) comparing the first and a second records of shear wave seismic energy to determine azimuthal variations in the earth's subsurface.

* * * * *